(12) United States Patent
Dunshea et al.

(10) Patent No.: US 8,627,327 B2
(45) Date of Patent: Jan. 7, 2014

(54) THREAD CLASSIFICATION SUSPENSION

(75) Inventors: Andrew Dunshea, Austin, TX (US); Douglas James Griffith, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1584 days.

(21) Appl. No.: 11/923,360

(22) Filed: Oct. 24, 2007

(65) Prior Publication Data

US 2009/0113433 A1 Apr. 30, 2009

(51) Int. Cl.
*G06F 9/46* (2006.01)
*G06F 13/00* (2006.01)

(52) U.S. Cl.
USPC ........... 718/104; 718/102; 718/105; 711/151; 711/152; 711/158

(58) Field of Classification Search
None
See application file for complete search history.

(56) References Cited

U.S. PATENT DOCUMENTS

| | | | |
|---|---|---|---|
| 6,910,210 B1 * | 6/2005 | Chew | 718/103 |
| 6,941,437 B2 * | 9/2005 | Cook et al. | 711/173 |
| 7,080,220 B2 | 7/2006 | Dunshea et al. | |
| 2002/0107901 A1 * | 8/2002 | Hay | 709/102 |
| 2004/0216112 A1 | 10/2004 | Accapadi et al. | |
| 2005/0022186 A1 | 1/2005 | Accapadi et al. | |
| 2005/0086660 A1 | 4/2005 | Accapadi et al. | |
| 2005/0149933 A1 * | 7/2005 | Saito et al. | 718/100 |
| 2005/0246707 A1 * | 11/2005 | Ismail et al. | 718/100 |
| 2006/0036810 A1 | 2/2006 | Accapadi et al. | |
| 2006/0037020 A1 | 2/2006 | Accapadi et al. | |
| 2006/0280434 A1 * | 12/2006 | Suzuki et al. | 386/83 |
| 2007/0157207 A1 * | 7/2007 | Kim et al. | 718/103 |
| 2007/0157210 A1 * | 7/2007 | Inoue | 718/105 |
| 2012/0240205 A1 * | 9/2012 | Casey | 726/5 |

* cited by examiner

*Primary Examiner* — Abdullah Al Kawsar

(74) *Attorney, Agent, or Firm* — Yee & Associates, P.C.; David A. Mims, Jr.

(57) ABSTRACT

The exemplary embodiments provide a computer-implemented method, apparatus, and computer-usable program code for managing memory. A notice of a shortage of real memory is received. For each active thread, the thread classification of the active thread is compared to a global hierarchy of thread classifications to determine a thread to affect. The global hierarchy of thread classifications defines the relative importance of each thread classification. An action to take for the determined thread is determined. The determined action is performed for the determined thread.

21 Claims, 3 Drawing Sheets

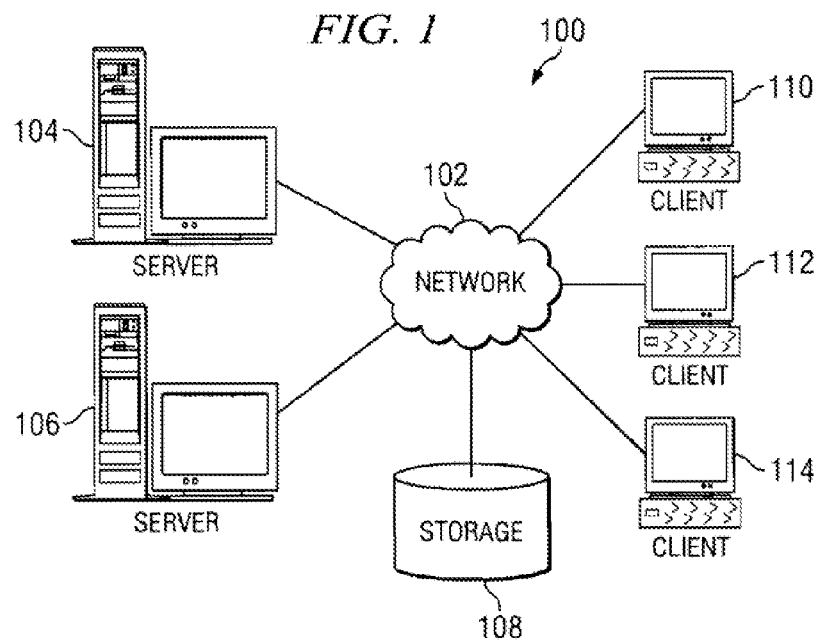

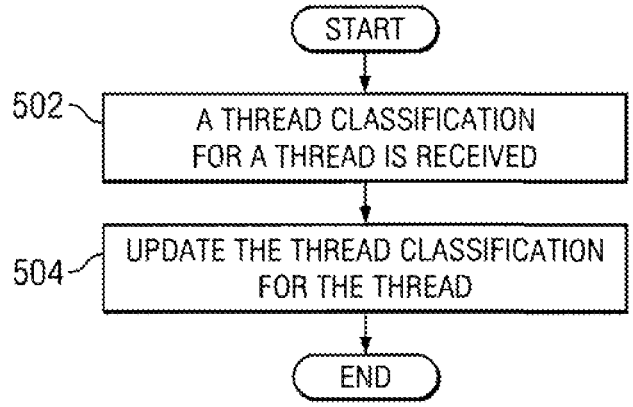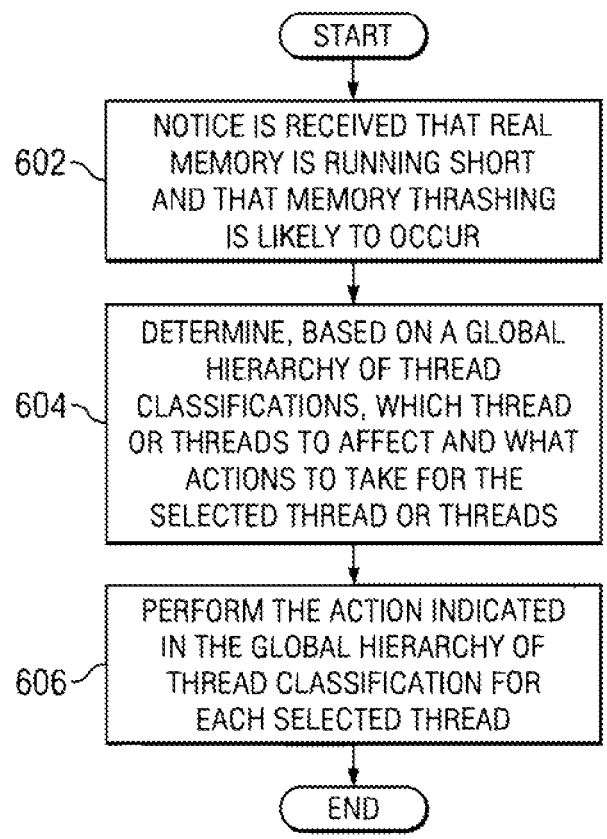

THREAD CLASSIFICATION SUSPENSION

BACKGROUND OF THE INVENTION

1. Field of the Invention

The present invention relates generally to data processing systems. More specifically, exemplary embodiments provide a method, computer program product and a system for managing memory in a data processing system.

2. Description of the Related Art

System memory is difficult to manage in applications with adhoc/variable memory requirements where the amount of memory a particular thread(s) requires is highly dependent on the complexity of the transformation or query being performed by the thread(s). For example, a SAP query, which is complex and retrieves a large data-set, may require a significantly greater amount of memory than a simple query. Large, complex data base queries are another good example of where complex transformations require very large amounts of memory.

When a shortage of memory condition occurs, memory load control algorithms are used to suspend threads, or even kill threads, in order to free memory for other processes/threads running, avoiding a memory thrashing condition from occurring. Memory thrashing is a degraded case of swapping. Memory thrashing means that every time a process wants to use memory, the process has to swap some data out and some more data in, resulting in the data processing system running very slowly. Currently, the memory load control algorithms select threads by either randomly picking threads, or choosing threads with the greatest amount of memory allocated.

Random selection may affect a required subsystem/component that is not predeterministic for the administration of the system. A suspension of a critical service, such as, for example, High Availability Cluster Multi-Processing (HACMP)/general parallel file system (GPFS), can, and often does, result in a complete system outage. HACMP is a product that provides fail-over capability. That is, the product allows for a second node to take over for a first, failed node. GPFS is a clustered distributed file system. Even the suspension of non-critical components can cause serious issues to the business, such as, for example, missed service level agreements (SLA's) or unacceptable response times to users.

An alternative approach to this problem tried in the past has been to set real memory limits per process, sometimes grouped within a workload manager (WLM) class, for example. A workload manager manages resources given to applications. A WLM class is an object that encapsulates WLM definitions and associations to various applications. When an application process attempts to exceed the real memory limit, the application process is forced to page-out some of the existing pages of the application process in real memory in order to make room.

The problem with this approach is that any paging activity can result in severe performance degradation to the system as a whole. In severe cases, paging can result in page space becoming exhausted, or system performance issues, which can lead to outages, such as, for example, a delayed heartbeat. A heartbeat refers to a mechanism that nodes uses to signal their availability between each other. For example, the nodes could send a sync pulse every few seconds to indicate that they are still up and available. Also, this approach may force a process to page, when there is free real memory available. These limits also need to be adjusted as the workload/resource changes and must assume worse case scenario when the limits are set.

SUMMARY OF THE INVENTION

The exemplary embodiments provide a computer-implemented method, apparatus, and computer-usable program code for managing memory. A notice of a shortage of real memory is received. For each active thread, the thread classification of the active thread is compared to a global hierarchy of thread classifications to determine a thread to affect. The global hierarchy of thread classifications defines the relative importance of each thread classification. An action to take for the determined thread is determined. The determined action is performed for the determined thread.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which illustrative embodiments may be implemented;

FIG. 2 is a block diagram of a data processing system in which the illustrative embodiments may be implemented;

FIG. 5 is a flowchart illustrating the operation of dynamically classifying the work a thread or process is performing in accordance with an exemplary embodiment; and FIG. 6 is a flowchart illustrating the operation of suspending a process based on a global hierarchy of thread classifications that define the relative importance of each thread classification, in accordance with an exemplary embodiment.

DETAILED DESCRIPTION OF THE PREFERRED EMBODIMENT

Figure 3:
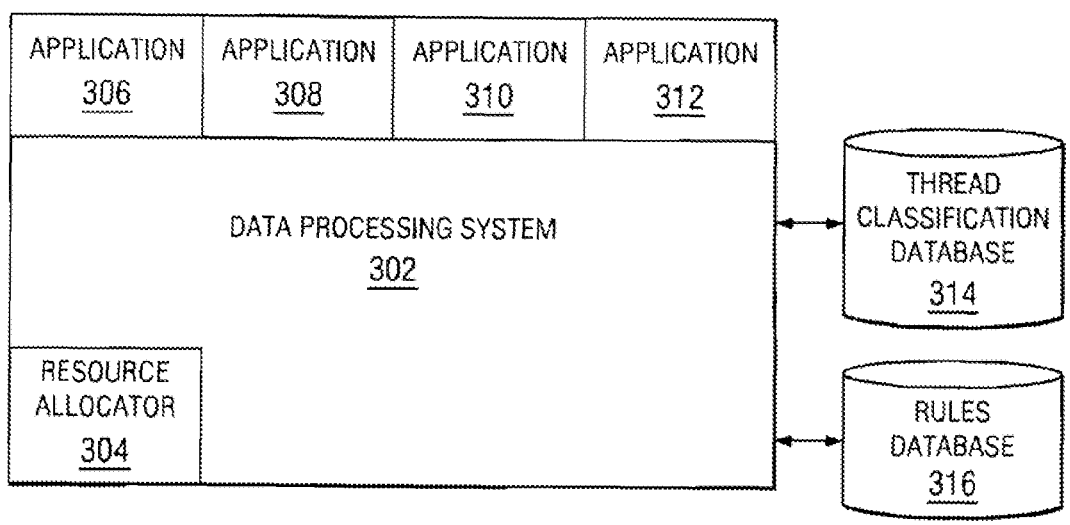
FIG. 3 is a block diagram of a system for suspending a process based on a global hierarchy of thread classifications that define the relative importance of each thread classification, in accordance with an exemplary embodiment.

With reference now to the figures and in particular with reference to FIGS. 1-2, exemplary diagrams of data processing environments are provided in which illustrative embodiments may be implemented. It should be appreciated that FIGS. 1-2 are only exemplary, and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (A), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system, and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments define a global hierarchy of thread classifications that define the relative importance of each thread classification. When real memory is tightly constrained, the system uses the global thread classification hierarchy to suspend the least important processes. Exemplary embodiments thus provide a flexible and deterministic approach that can be applied when a memory shortage occurs without tuning for a worse case scenario or requiring the administrators to adjust real memory limits as either the workload or the system resource changes. The workload is used to determine the thread classification. A process can have many threads.

Exemplary embodiments allow a thread or process to statically or dynamically classify the work the thread or process is performing. Processes can statically classify themselves, as once the process classifies the work the application is performing, the classification remains until switched. Thus, when a process changes the work the process is performing, the process classifies the new work being performed. For example, a DB2 thread when given a complex query would classify the work being performed as performing a complex query. The thread classifications could be passed either from the user process or from the worker thread actually running the query. A critical process or thread could provide a thread classification that indicates the process being performed is of critical importance to the system.

Each individual application determines the current thread classification for the application based on what the application is doing at any particular point in time. For example, a database query could use an optimizer to determine the complexity of the query, or a large complex database query may use the transformation steps of the large complex database query to determine a thread classification for the large complex database query.

Exemplary embodiments allow for defining the relative importance of each thread classification in comparison to the other work being performed. Thread classifications are further refined based on user identification, or, in an alternate embodiment, based on process executable. For example, an alternative consideration could be the amount of resources, such as memory, being consumed versus other processes or versus an excepted allowance. For example, the classification could give an expected amount of memory used by a process with the classification. This amount could be considered in light of the actual memory the process is using. That is, when selecting from an otherwise similar group of threads running under the same classification, the largest consumer of memory could become less favored. Additionally, exemplary embodiments provide a global default thread classification to handle any process that does not have a thread classification.

When the system runs short of real memory and enters a state in which memory thrashing is likely to occur, the system will use the table of thread classifications to determine the order in which processes/threads should be suspended. For each thread classification, the administrator will be allowed to define the action to be taken to reduce memory, for example suspend the thread, kill the thread, or perform some other user defined option, such as, for example, run a particular script.

The relative importance of each thread classification is defined by a set of rules generated by the system administrator. Each application or user of an application submits a list of the thread classifications that the application uses to classify work being performed. Further, a list of user identifiers and/or process executables for each application is also submitted. Based on this information, a system administrator establishes a set of rules that define which processes the system considers more important than other processes. This set of rules defines a global hierarchy of thread classifications that define the relative importance of each thread classification.

The use of user identifications and process executables tied to the thread classifications allows for finer grained tuning of the global hierarchy of thread classifications. For example, take the case where the situation has arisen that the system needs to suspend or kill a thread because of lack of memory. Based on the global hierarchy, the system has decided that work with a thread classification of X of application Y needs to be suspended. However, there are two users of application Y currently processing work with a thread classification of X. The system then determines if one user is more important than the other user.

For example, user 1 could be a member of the accounts department while user 2 is an employee in another department. The global hierarchy may have rules that state that users of the account department are more important then other users, so then the process belonging to user 2 would be suspended. Further, the global hierarchy may have rules further breaking the importance of a user to the individual's user level in that user A may be more important then user B because user A is a higher ranking official, such as a manager, within a company, and so on.

Turning back to the figures, FIG. 3 is a block diagram of a system for suspending a process based on a global hierarchy of thread classifications that define the relative importance of each thread classification, in accordance with an exemplary embodiment. System 300 comprises data processing system 302, which may be implemented as a data processing system such as data processing system 200 in FIG. 2. Data processing system 302 comprises resource allocator 304, applications 306, 308, 310, and 312, which are running on data processing system 302, thread classification database 314 and rules database 316, wherein the rules define a global hierarchy of thread classifications.

Thread classification database 314 is a current record of all the active processes and the current classification of each active process. In an alternate embodiment, rules database 316 also includes instructions as to what specific actions to take if a particular process is chosen to reduce memory usage. While thread classification database 314 and rules database 316 are depicted as databases in the present exemplary embodiment, alternate embodiments encompass implementing thread classification database 314 and rules database 316 as a table or a file, or any in other suitable form.

When applications 306, 308, 310, and 312 running on data processing system 302 cause data processing system 302 to run short of real memory and enter a state in which memory thrashing is likely to occur, resource allocator 304 uses thread classification database 314 and rules database 316 to determine the order in which processes/threads of applications 306, 308, 310, and 312 should be suspended.

Figure 4:
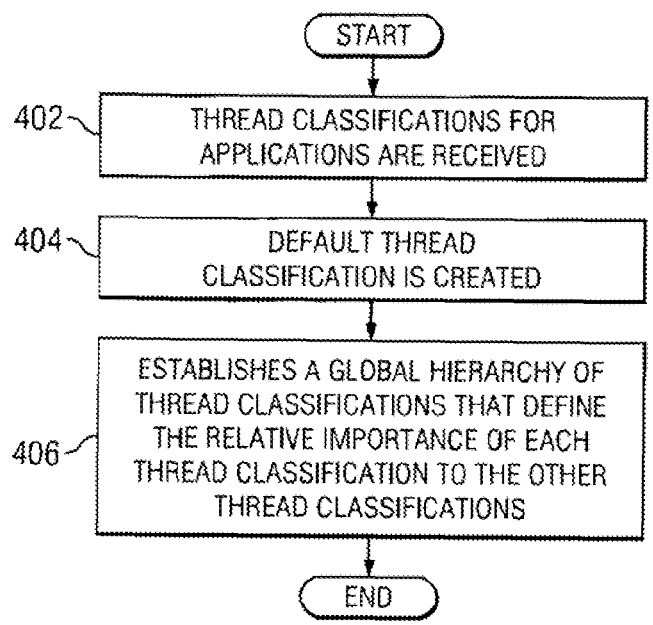
FIG. 4 is a flowchart illustrating the operation of establishing a global hierarchy of thread classifications that define the relative importance of each thread classification in accordance with an exemplary embodiment.

FIG. 4 is a flowchart illustrating the operation of establishing a global hierarchy of thread classifications that define the relative importance of each thread classification in accordance with an exemplary embodiment. The steps of FIG. 4 may be implemented in a resource allocator, such as resource allocator 304 in FIG. 3.

The operation begins when thread classifications for applications are received (step 402). A default thread classification is created (step 404). The default classification serves to classify any process that, for whatever reason, is not classified by an application. The thread classifications and default classification are combined with user identifications and process executables to generate a set of rules that establishes a global hierarchy of thread classifications that define the relative importance of each thread classification to the other thread classifications (step 406) and the process ends.

FIG. 5 is a flowchart illustrating the operation of dynamically classifying the work a thread or process is performing in accordance with an exemplary embodiment. The steps of FIG. 5 may be implemented in a resource allocator, such as resource allocator 304 in FIG. 3.

The operation begins when a classification for a process is received (step 502). The thread classification for that process is then updated based on the received thread classification (step 504) and the process ends.

FIG. 6 is a flowchart illustrating the operation of suspending a process based on a global hierarchy of thread classifications that define the relative importance of each thread classification, in accordance with an exemplary embodiment. The steps of FIG. 6 may be implemented in a resource allocator, such as resource allocator 304 in FIG. 3.

The operation begins when a notice is received that real memory is running short and that thrashing is likely to occur (step 602). The operating system monitors memory usage and triggers an alarm when paging space becomes critically short. When paging space becomes critically short, the operating system begins the selection process. The operation examines all the active processes and determines, based on a global hierarchy of thread classifications, which process or processes to affect in order to reduce the memory problem and what actions to take for the selected process or processes (step 604). The operation then performs the action indicated in the global hierarchy of thread classification for each affected process (step 606) and the process ends.

Exemplary embodiments define a global hierarchy of thread classifications that define the relative importance of each thread classification. When real memory is tightly constrained, the system uses the global thread classification hierarchy to suspend the least important processes. Exemplary embodiments thus provide a flexible and deterministic approach that can be applied when a memory shortage occurs without tuning for a worse case scenario or requiring the administrators to adjust real memory limits as either the workload or the system resource changes.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for managing memory, the computer-implemented method comprising:
   monitoring memory usage while running a plurality of applications and each individual application of the plurality of the applications comprised of a plurality of active threads;
   receiving a notice of a shortage of real memory while running the plurality of applications;
   establishing a global hierarchy of thread classifications for the plurality of active threads of the each individual application and a default thread classification for any process not classified by an application running on a computer;
   responsive to receiving the notice, comparing, for each active thread of the plurality of applications, a thread classification of the plurality of active threads to the global hierarchy of thread classifications, wherein the global hierarchy of thread classifications defines a relative importance of each thread classification based on a classification of a process currently being performed by each active thread of the each individual application, an identification of a user performing the process and process executables, to identify a selected thread to affect, wherein the classification of the process is determined by the each individual application comprising the active threads;
   determining an action to take for the selected thread to form a determined action; and
   performing the determined action for the selected thread.

2. The computer-implemented method of claim 1, further comprising:
   receiving the thread classification from a thread; and
   storing the thread classification for the thread.

3. The computer-implemented method of claim 2, further comprising:
   receiving a new thread classification from the thread; and
   updating the thread classification for the thread.

4. The computer-implemented method of claim 1, further comprising:
   creating a default thread classification; and
   receiving at least one thread classification for at least one application.

5. The computer-implemented method of claim 4, further comprising:
   creating the global hierarchy of thread classifications based on the default classification and the received at least one thread classification.

6. The computer-implemented method of claim 1, wherein the thread classification is based on a workload of the thread.

7. The computer-implemented method of claim 1, wherein the determined action is to kill the determined thread.

8. The computer-implemented method of claim 1, further comprising:
   performing the action indicated in the global hierarchy of thread classification for each selected thread.

9. A computer program product comprising:
   a computer-readable storage device storing computer-usable program code for managing memory, the computer program product comprising:

computer-usable program code for monitoring memory usage while running a plurality of applications and each individual application of the plurality of applications comprised of a plurality of active threads;

computer-usable program code for receiving a notice of a shortage of real memory while running the plurality of applications;

computer-usable program code for establishing a global hierarchy of thread classifications for the plurality of applications of the each individual application and a default thread classification for any process not classified by an application running on a computer;

computer-usable program code, responsive to receiving the notice, for comparing, for each active thread of the plurality of applications, a thread classification of the plurality of active threads to the global hierarchy of thread classifications, wherein the global hierarchy of thread classifications defines a relative importance of each thread classification based on a classification of a process currently being performed by each active thread of the each individual application, an identification of a user performing the process and process executables, to identify a selected thread to affect, wherein the classification of the process is determined by the each individual application comprising the active threads;

computer-usable program code for determining an action to take for the selected thread to form a determined action; and computer-usable program code for performing the determined action for the selected thread.

10. The computer program product of claim 9, further comprising:

computer-usable program code for receiving the thread classification from a thread; and computer-usable program code for storing the thread classification for the thread.

11. The computer program product of claim 10, further comprising:

computer-usable program code for receiving a new thread classification from the thread; and computer-usable program code for updating the thread classification for the thread.

12. The computer program product of claim 9, further comprising:

computer-usable program code for creating a default thread classification; and computer-usable program code for receiving at least one thread classification for at least one application.

13. The computer program product of claim 12, further comprising:

computer-usable program code for creating the global hierarchy of thread classifications based on the default classification and the received at least one thread classification.

14. The computer program product of claim 9, wherein the thread classification is based on a workload of a thread.

15. The computer program product of claim 9, wherein the determined action is to kill the determined thread.

16. A data processing system for managing memory, the data processing system comprising:

a bus;

a communications unit connected to the bus;

a storage device connected to the bus, wherein the storage device includes computer-usable program code; and a processor unit connected to the bus, wherein the processor unit executes the computer-usable program code to monitor memory usage while running a plurality of applications and each individual application of the plurality of applications comprised of a plurality of active threads;

receive a notice of a shortage of real memory while running the plurality of applications;

establish a global hierarchy of thread classifications for the plurality of active threads of the each individual application and a default thread classification for any process not classified by an application running on a computer;

responsive to receiving the notice, compare, for each active thread of the plurality of applications, a thread classification of the plurality of active threads to the global hierarchy of thread classifications, wherein the global hierarchy of thread classifications defines a relative importance of each thread classification based on a classification of a process currently being performed by each active thread of the each individual application, an identification of a user performing the process and process executables, to identify a selected thread to affect, wherein the classification of the process is determined by the each individual application comprising the active threads;

determine an action to take for the selected thread to form a determined action; and perform the determined action for the selected thread.

17. The data processing system of claim 16, wherein the processor further executes the computer-usable program code to receive the thread classification from a thread; and store the thread classification for the thread.

18. The data processing system of claim 17, wherein the processor further executes the computer-usable program code to receive a new thread classification from the thread; and update the thread classification for the thread.

19. The data processing system of claim 16, wherein the processor further executes the computer-usable program code to create a default thread classification; and receive at least one thread classification for at least one application.

20. The data processing system of claim 19, wherein the processor further executes the computer-usable program code to create the global hierarchy of thread classifications based on the default classification and the received at least one thread classification.

21. The data processing system of claim 16, wherein the thread classification is based on a workload of a thread.

* * * * *